April 17, 1945.  H. OLKEN  2,373,846
METHOD AND APPARATUS FOR MOISTURE MEASUREMENT OF MATERIALS
Filed Aug. 2, 1941  2 Sheets-Sheet 1

Inventor
HYMAN OLKEN
by Ezekiel Wolf
his Attorney

April 17, 1945. H. OLKEN 2,373,846
METHOD AND APPARATUS FOR MOISTURE MEASUREMENT OF MATERIALS
Filed Aug. 2, 1941 2 Sheets-Sheet 2
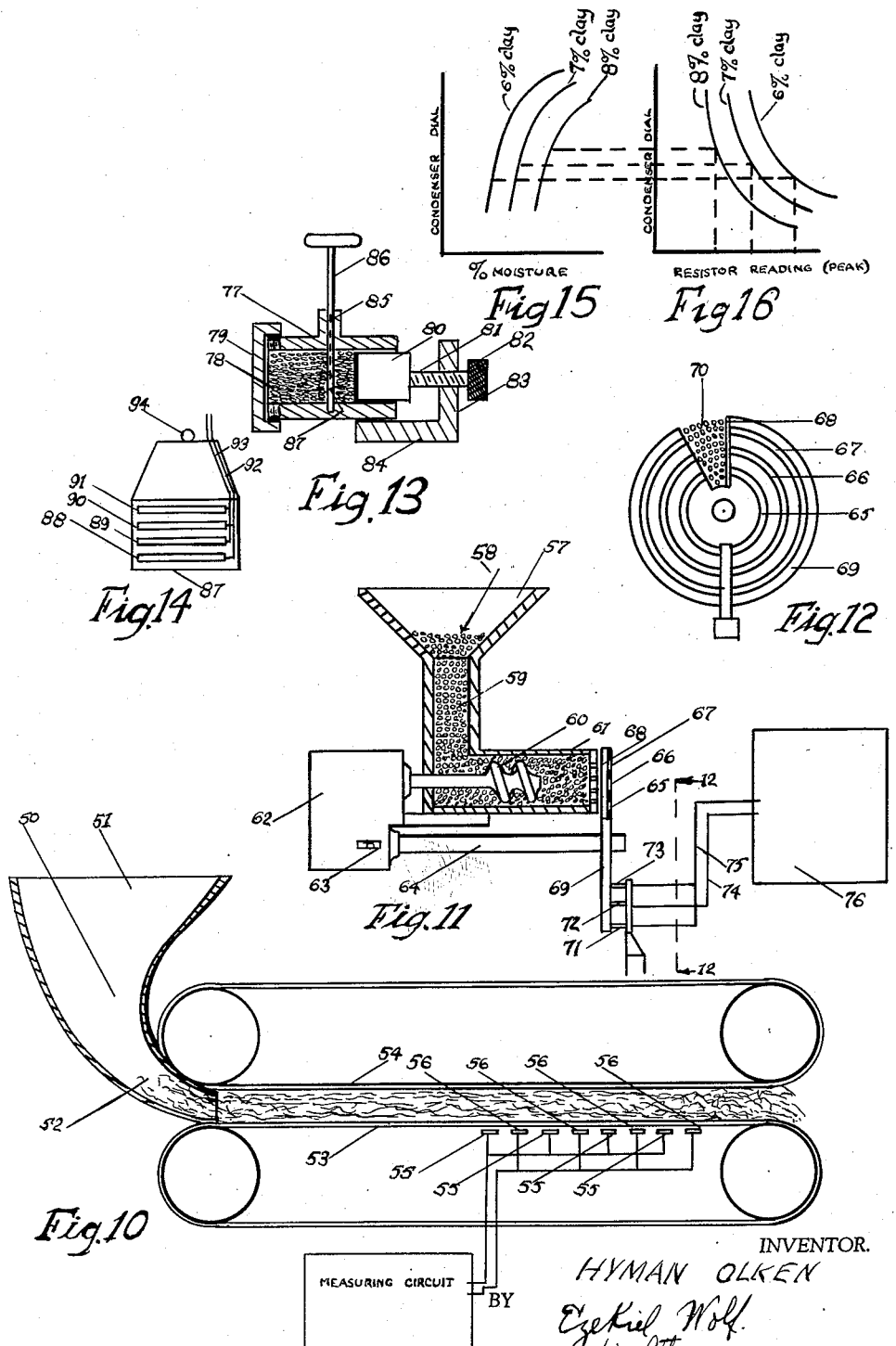
INVENTOR.
HYMAN OLKEN
BY Ezekiel Wolf
his Attorney Patented Apr. 17, 1945

2,373,846

UNITED STATES PATENT OFFICE 2,373,846

METHOD AND APPARATUS FOR MOISTURE MEASUREMENT OF MATERIALS

Hyman Olken, Washington, D. C.

Application August 2, 1941, Serial No. 405,262

4 Claims. (Cl. 175—183)

The present invention has for its object the improvement in methods and apparatus for measuring changes in, or testing, the composition or the properties of a material by the process of making electrical measurements on that material.

In commerce it often happens that the percentage of one component in a material determines the quality and thus fixes the price classification of that material. For example, wheat is graded by the percentage of moisture it contains, and is priced according to the grading.

Also, it occurs frequently in industry that the percentage content of one ingredient in a material determines the degree or manner of treatment to be followed in processing that material. For instance grain above a certain moisture content must be dried before being put in storage, or it will spoil quickly.

It has been found that the electrical characteristics of a material often correlate closely with its properties (thickness, hardness, etc.), or its composition (moisture content, etc.). And since electrical measurements can be made quickly, conveniently, it has become common practice to set up electrical measurements as quick, convenient methods; or as continuous methods, for testing the properties or composition of materials.

Now as the art of electrical testing developed it progressed mainly along two main lines: first that of testing a material by measuring its changes of conductivity; secondly, that of measuring dielectric constant changes to indicate changes of the material.

In the latter branch of the art, it is by now well known that, to measure or test the changes in the properties or composition of a material by measuring changes of its dielectric constant, the material should be made the dielectric of a condenser, and the changes in the capacity of this condenser should be measured by any one of a number of standard methods (bridge, resonance, etc.) (Allen Patent No. 1,708,074; Eyer Patent No. 2,043,241, and others.)

It is also well known in this branch of the art that, to eliminate abberations in the capacity measurement due to contact conductivity, between the material tested and the condenser plates, a sheet of good insulation should be inserted between the test material and each condenser plate. (See patents of Eyer No. 2,043,241; Bjorndal No. 2,071,607.)

Now it is common belief in the art that what is thus measured are changes in the dielectric constant of the tested material. In reality that is not the case. What is really measured are changes in the apparent capacity across a dielectric having appreciable leakage conductance. By apparent capacity is meant the reactive capacitive component as it appears across the condenser. This is a function of the resistance or leakage as well as that of the actual capacity as will appear later.

It is the recognition of this fact and the application of it to a chosen range of electrical constants which permits accurate measurements to be made that form the basis of the present invention.

The applicant, after intensive work in this art, has discovered the laws for the proper relations in the proportioning and spacing of the condenser elements and choice of frequencies to give a desirable measuring range for a particular material; and for a combination of proportions in a test apparatus fitting these relations.

The present invention is more particularly concerned with measurements of moisture content of material in which electrical losses at the measuring frequencies are comparatively small. Other modifications of the present methods may be applied to materials where losses are relatively high, as for instance, moist clay and moist fish meal.

The present invention will be more clearly understood from the description in the specification below describing the invention when taken in connection with the drawings, in which:

Figures 10 and 11 illustrate a further modification of the invention.

Figure 12 shows a detail of an end view as viewed in the direction of the line 12—12 of Figure 11.

Figure 13 shows a further modification in section.

Figure 14 shows a detail of an element of Figure 13, and,

Figures 15 and 16 show curves by means of which two variables in the same material are measured.

Figure 1:
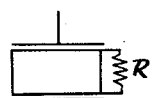
Figure 1 shows the equivalent electrical circuit with the materials between the condenser plates.
Figure 2:
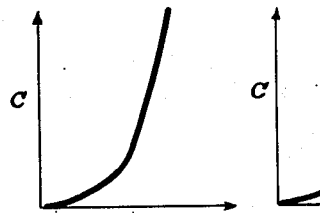
Figures 2, 3, 4 and 5 illustrate curves showing how the contents of the circuit are established.

If a pure insulating material were placed between the plates of a condenser and a high resistance R shunted across, Figure 1, the capacity readings for that condenser would vary with the conductivity of the shunt along a curve as diagrammed in Figure 2. The whole impedance made up of the resistance and the capacitive reactance is that of a parallel circuit and equals $-Z$ $$Z = \frac{1}{\frac{1}{r} - jc\omega}$$

The apparent resistance which may be denoted by R and the admittance or conductivity which may be denoted by $$\frac{1}{R}$$

is determined according to the equation below:

$$R = \frac{r}{1 + r^2 c^2 \omega^2}$$

The capacitive reactance is determined by the imaginary component and may be denoted as X. This is shown in the following equation.

$$X = \frac{r^2 c w}{1 + r^2 c^2 w^2}$$

The apparent capacity is related to the reactance in the following equation:

$$X = \frac{1}{Cw}$$

or $$C = \frac{1 + r^2 c^2 w^2}{r^2 c w^2}$$

Figure 3:
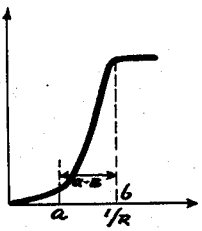

Comparing the respective values of $$\frac{1}{R}$$

and C, it will be noted that this will produce a curve in accordance with Figure 2. This curve is a steep straight-line logarithmic curve rising to infinity. The presence of the test material with two insulating sheets between test material and condenser plates, to cut out conductivity abberations at the points of contact, would put a limiting shelf to the top part of this characteristic, making it saturation-curve shaped, as shown in Figure 3.

Figure 4:
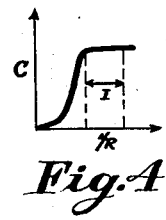
Figure 5:
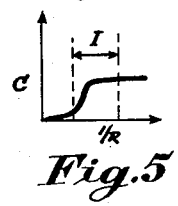

The steep portion between $a$—$b$ of this curve is the useful range for measurement purposes. If certain proportions are observed in the elements of the test condenser and their relative spacing, and a certain relation of measuring current frequency to these values is kept, this range $a$—$b$ can be made steep, giving a high sensitivity and its cut-off (saturation) point be put at a high value, thus affording a wide measuring range, to cover a wide range of changes in the material. But a slight departure from these proper proportions in the materials of the condenser, their spacing, and their relation to the frequency of the measuring current used will put the measuring range ($a$—$b$) in a region unsuitable for the values of the material to be tested (for instance range $l$ in Figure 4) or will bring the cut-off point so low as to make the measuring range impracticably small (Figure 5) or both.

In the analysis below two cases are considered relating the measuring range with respect to the moisture content of the material to be observed showing how the measuring range may be adjusted to suit the material. The extension of this same system may be applied to various materials and for different purposes, as for instance to the measurement of alcoholic contents of beer, thickness of sheet products, and numerous other maesurements.

(I) For the measuring range to start at the minimum value (of moisture content, let us say) to be measured. The requirement here is that $$\left(\frac{1}{W^2 C^2 R^2_m}\right)$$

be greater than one where;

$R_m$ = resistance of material (sample in condenser) at minimum moisture content.

C = capacity of condenser with test material bone dry.

= $k C_1$ where:

$C_1$ = capacity of condenser empty.

$k$ = dielectric constant of test material when bone dry (usually of a value from one to three or four).

The above term may be shown to be the dominant term in the equation for effective capacitance when its value becomes greater than unity.

(II) For the measuring range to come up to, or above the maximum value (of moisture content, let us say) to be measured. The requirement here is that: $W^2 C^2 R_M^2$ shall be substantially equal to $$\frac{2C}{C_0 + 2C}$$

where

C = capacity of condenser with test material bone dry.

$C_0$ = capacity due to each sheet of insulation.

$R_M$ = resistance of material (sample in condenser) at maximum moisture content.

W, as used throughout here symbolizes the Greek letter "omega," used widely in radio literature to indicate the term $2\pi f$, where $\pi = 3.14$, $f$ = frequency of the measuring current used.

When the above relationship is substantially reached then it may be shown that the effective capacity with increasing change of moisture remains substantially constant.

As to values of C and W, any value of either one could be chosen, as long as the relation $$\frac{1}{W^2 C^2 R^2_M}$$

(I) be kept for the lowest value to be measured, and the relation $$\frac{2C}{C_0 + 2C} = W^2 C^2 R^2_M$$

be maintained for the highest value to be measured. The practical determining factor in the choice of the values of W and C will be the size of the sample to be used.

Where a large sample must be used, as for instance in the case of grain, where a considerable quantity is required to make the sample a fair average of the entire bushel, the test condenser will have to be large. That will make for a large $C_1$. With a large $C_1$ required, to make $$\left(\frac{1}{W^2 C^2 R^2_m}\right)$$

greater than unity it will be necessary to choose a low value of W—say about 300,000, instead of the 10,000,000 value used in most of the experiments involved in developing this invention.

On the other hand where the material to be tested is very scarce or very valuable, so that only very small quantities can be used for testing (such as blood serum, for instance), a very small test condenser will be required. The value of $C_1$, hence of $C$, will be very small, so that a large value of $W$, therefore a high frequency of measuring current will then be needed to make $W^2C^2R_M^2$ substantially equal to $$\frac{2C}{C_0+2C}$$

It is to be understood that this invention is not confined to the illustrative application cited, but is a broad principle, equally applicable (with needed slight differences in form of apparatus) for testing a continuous stream of shredded, ground, or comminuted material; for testing a continuous sheet or web of material; or for testing liquids (alcohol content of beer, etc.,) either in discreet samples or as a continuous flow.

Figures 6, 7, 8 and 9 show apparatus embodying the present invention for carrying out the methods described above.

Figure 6:
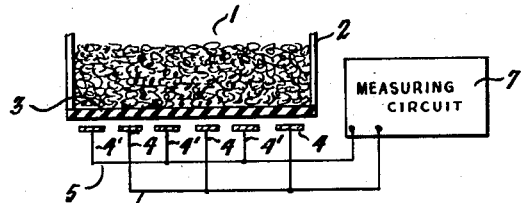
Figure 6 shows schematically one form of apparatus.

In Figure 6 the grain 1 or other similar material whose moisture contents are to be measured, is placed in a container 2 which is provided with an insulating base member 3 on the other side of which is positioned by any suitable means, as for instance, a supporting frame, condenser plates 4, 4, 4, etc., and 4', 4', etc. The condenser plates 4 are connected to a common line 6 and the condenser plates 4' to a common line 5 which lines connect to the measuring circuit 7.

Figure 7:
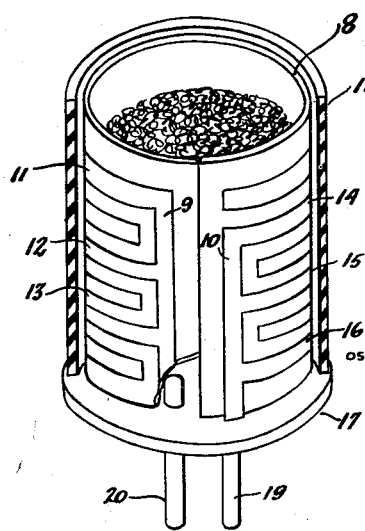
Figure 7 shows partly in fragmentary section another form of the apparatus.

In the arrangement shown in Figure 7, the container 8 is formed as a cylinder on the outside of which are fastened two sets of conductive plates, each comprising vertical elements 9 and 10 with horizontal extending arms, the arms 11, 12 and 13, extending horizontally from the arms 9 about the container 8, and the arms 14, 15 and 16 extending horizontally around the container from the vertical element 10. The horizontal arms are so arranged that the arms of one set horizontally lie next to the arms of the other set at the face of the container. It will be seen that in this way two sets of arms form condenser plates of the same type described in Figure 6. The container 8 is preferably positioned on a base 17 surrounded by a protective insulating member 18 and the leads from each set of plates is brought out to plug-in members 19 and 20.

Figure 8:
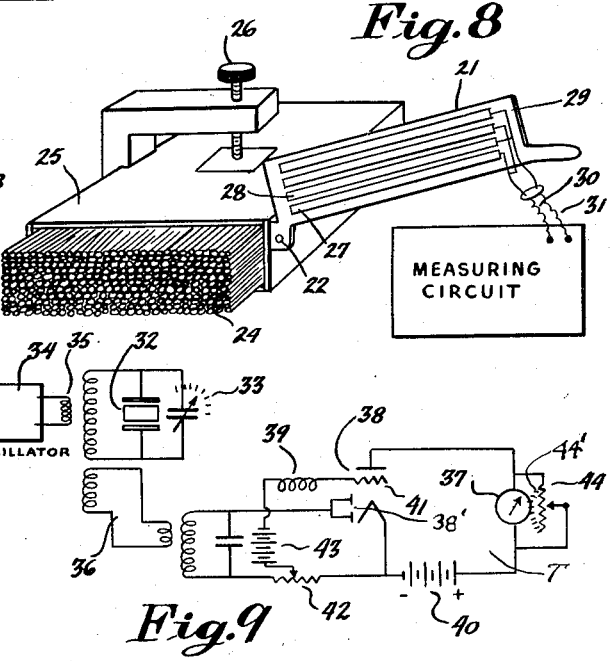
Figure 8 shows a still further modification.

The arrangement shown in Figure 8 is particularly applicable to measurements with respect to cross sections of materials. In this case a knife blade 21 is provided, which is pivoted by means of the pivot 22 at the side of the box 23 in which the material 24, which may be of fibrous nature, is compressed by means of the clamping plate 25 and the clamping screw 26. The knife blade 21 is provided at its external side with two sets of electrode plates 27 and 28, respectively. Execpt for the cutting edge, the other portion 29 of the knife blade is made of insulating material. In the operation of this device the blade is brought down to sever transversely the end of the block of compressed material and measurement is then made on the measuring circuit 7 which is connected by leads 30 and 31 to the electrodes 27 and 28 respectively. This permits the measurements to be made immediately after the material has been cut transversely and therefore before the ends are given a chance to dry out.

The condenser elements 27 and 28 in Figure 8 are so made that the flux lines between the electrodes run transversely across all the grains or fibers and thus the measurements truly reflect the compositions in all sections or layers of the material, eliminating all measurements other than those taking in all of the grains or fibers and avoiding measurements of single spots of excessive or very little moisture.

In Figure 10 a system is shown whereby a continuous method of measurement may be used on various kinds of fibers, grains or other materials. In this case the material passing in the direction of the arrow 50 into the hopper or chute 51 is carried along to the bottom of the chute 52 where it is picked up and carried by means of the conveyor belts 53 and 54 across the measuring table. The conveyor belts 53 and 54 may be of any desired type for carrying along the material to be tested, as long as a constant uniform section of material is presented across the measuring section of the system. Beneath the conveyor 53 in close proximity to it may be placed two groups of electrodes, 55, 55, etc., forming one group, and 56, 56, etc., forming the other group which are connected to the measuring circuit as shown in Figure 8. In Figure 11 an arrangement is indicated whereby the material may be cut as a measurement is being made somewhat similar to the arrangement indicated in Figure 8. In this arrangement a hopper 57 is provided in which the material is fed as indicated by the arrow 58 through a conveying tube 59 where it is forced by means of the screw 60 against the perforated face plate 61. The motor 62 may be operated constantly to turn the screw 60 and a clutch 63 may be provided for connecting the shaft 64 so that it may also be turned by the motor 62. The shaft 64 carries the condenser electrode plates 65, 66 and 67 and the cutting blade 68 all mounted on the insulating disc 69 which has a cut-out sector 70 at one side on which the cutting blade 68 is placed. The disc 69 is positioned in front of the perforated plate 61 and is rotated so that the knife blade 68 slices across the front of the perforated plate as the material is emerging from it. During one revolution of the disc 69 therefore, the condenser electrodes 65, 66 and 67 are positioned opposite the freshly cut material held up against the perforations in the plate 61 and this plate of course should be on non-conducting material.

The electrode plates 65, 66 and 67, together with the insulating plate 69, forms a condenser similar to that of Figure 6, and the values of this condenser must be chosen to satisfy the relations given in the equations above.

A set of brushes 71, 72 and 73 is provided to contact the condenser plates and furnish connections for the lines 74 and 75 to the measuring device 76.

In the arrangement in Figures 10 and 11, substantially continuous measurements may be obtained of material passing through the device.

In Figures 13 and 14 an arrangement is shown by which specimens may be specially tested. In this case a container 77 is provided with an open end 78 which may be covered by a cover 79. The material is spaced in the open end 78 and it is then squeezed or compressed by means of the piston 80 which may be operated by means of the screw 81 from the knurled head 82. The screw 81 is preferably threaded into a bracket 83 which is supported at the side of the container 77 by the arm 84. A slot 85 is provided at one side of the casing in which a knife blade 86 may be inserted. This knife blade is similar in many respects to that shown in Figure 8 and comprises the cutting edge 87 and a plurality of buried electrodes 88, 89, 90 and 91, which as indicated in Figure 14 are connected in pairs to the conductors 92 and 93. The plate is made of insulating material other than the contacting plates and the knife edge and is provided at its top with a handle 94 by means of which it is forced through the guiding slot 85 across the section of the material after the material has been compressed in place. When the knife blade has been forced down completely a measurement of the specimen may be made.

Figure 9:
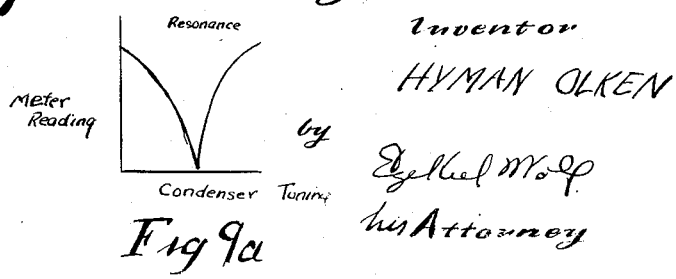
Figure 9 shows a circuit diagram for making the necessary measurements.

In each of the arrangements above described, the measuring circuit as shown in Figure 9 may be used in which the container is illustrated diagrammatically as 32 and the measuring condenser which may be tuned or set as indicated by the lines of calibration is shown as 33. The oscillating frequency is provided by the oscillator 34 coupled to the container circuit loosely by means of the transformer 35. Further the coupling circuit 36 is provided between the measuring condenser circuit 33 and the indicating meter 37. This latter circuit includes a rectifier or detecting diode tube 38' and an amplifier tube 38 as well as a choke 39 and a power supply 40. The grid 41 of the tube 38 is supplied with a bias potential by a resistor 42 in series with a biasing battery 43 in such a way as to produce inverse phase amplification, that is, the greater the diode current, the less the plate current of the amplifier.

Figure 9A:
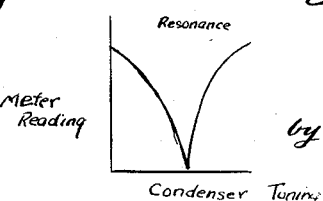
Figure 9a shows a curve of operation of Figure 9.

In the operation of this arrangement as the test circuit T is tuned for measuring a sample, 32, the plate current meter reading drops, due to inverse amplification of the resonance peak. When near resonance, the meter shunt resistance 44 is increased, making the meter more sensitive. With the meter sensitivity thus increased, the condenser 33 may be retuned and those adjustments may be successively repeated until the minimum current, hence resonance, is most sharply indicated, as shown in Figure 9a. It is to be noted that the tube bias voltages should be so arranged that the tube plate current (meter reading) at resonance, though a minimum, should be perceptibly above zero. For, if the inverse peak should fall below zero, there would be no way of observing the point of resonance.

This arrangement affords the following advantages: First, by inverting the peak most of the tuning—hence the active range of operation—comes at very low values of plate current. An extremely low range, high sensitivity meter can therefore be used, thereby making tuning very sensitive. Second, since inverting the peak brings the plate current close to zero level, very high gain amplifiers could be used. The low values of current in the operating (near resonance) range would prevent oscillation and instability, even at tremendous amplification. Thirdly the meter being constantly shunted, it would be at all times highly damped, and its readings therefore very even-changing, steady, making it highly readable.

The arrangement of the circuit of Figure 9 may be used to measure the changes in peak, or resonant current, due to each sample, as well as the apparent dielectric changes. This is particularly important in testing the moisture contents of materials where certain other components of the material tested also change, and thereby introduce confusing electrical changes, as for instance in the case of foundry and sand where-in the clay content usually varies considerably, along with the variations of the moisture content. For instance in measuring the moisture of such a material, a dial reading of 50 may mean the moisture content is 2.3% if the clay content is 5%, while if the clay content was 6% the same reading would mean a moisture content of 2.5%; and for clay content of 7% the reading may mean a moisture of 3%. For aid in determining the relationship in a case such as illustrated above, the following procedure is used.

First the empty condenser is plugged in and the circuit tuned to resonance, then instead of being satisfied with this adjustment with the resonance peak at any chance point on the meter scale, I adjust the calibrated shunt 44 as read against dial 44', to bring the resonance peak to full scale on the meter. The test condenser 32 is next filled with the sample to be tested, plugged in and the circuit readjusted to resonance. Then the calibrated meter shunt is again adjusted until the resonance peak is again brought to full scale reading on the meter.

The dial change from resonance with the test condenser empty to resonance with the test condenser full gives the capacity change for the material tested. However the shunt resistance is calibrated so that the change in shunt resistance from full scale meter reading with the test condenser empty to full scale meter reading with test condenser full of the sample, gives the peak change due to that material.

For example, if now a series of samples of known clay and moisture content are tested, and the peak measured by the resistor and capacity indicated by condenser dial changes are noted, we can then determine both clay and moisture content of any unknown sample in this manner: The data on the known samples are plotted as curves of condenser dial reading against moisture content, one curve for each clay content. (See Fig. 15.) The condenser dial readings are plotted against peak changes as indicated by resistor dial readings, also one curve for each clay content (Fig. 16). Then if we measure an unknown sample knowing the dial and peak change determines the clay content, from Fig. 16 and knowing the clay content, one can determine the moisture from Fig. 15. This method is applicable wherever two variables producing mainly two different electrical changes (apparent dielectric change, peak drop) are to be determined. For instance acidity content (dielectric change) and sludge content (peak drop) in oil, etc.

In testing any given material, a correlation curve determined from known samples is of course used to correlate the moisture contents with the apparent dielectric value of conductivity of the material so that the identification of a point on the curve, as for instance, the curve shown in Figure 3, for a given frequency of the oscillator 34, will determine the conductivity of the material and the apparent capacity of the sample in the measuring circuit. In obtaining measurements with the apparatus of Figure 9, the capacity of the adjustable measuring condenser 33 is read in any suitable manner for the desired resonance established in the circuit having the container or condenser sample 32. This capacity measurement will determine the apparent capacity measurement of the sample which really now is a circuit having a condenser with a shunt resistance after the fashion of the circuit of Figure 1, and may be called the apparent dielectric constant of the material in the sample where the actual container capacity is known. This apparent capacity measurement will determine, by means of the known relation of the conductivity to the apparent capacity measurement as illustrated by the curve of Figure 3, the conductivity and by correlating the conductivity so determined to the known standard data relating to moisture, the moisture is determined. If desired the curve of Figure 3 for known samples could be so calibrated.

Having now described my invention, I claim:

1. Means for measuring the conductivity of a material comprising a container having one side as a shearing plate, a plurality of electrodes forming condenser plates positioned on the external face of said shearing plate, and a measuring circuit for measuring the apparent capacity of the condenser so formed, means providing said condenser with dimensional values and insulating the electrodes thereof whereby the conductivity and capacity have a straight line relationship with each other.

2. Means for measuring the conductivity of a material comprising a container formed as a cylinder of insulating material having a plurality of conducting bands on the outside forming plates of a condenser, and a measuring circuit for measuring the apparent capacity of the condenser, means providing said condenser with dimensional values and insulating the electrodes thereof whereby the conductivity and capacity have a substantially straight line relationship with each other.

3. A method for the measurement of the moisture of a material of a fibrous nature by means of the measurement of the apparent dielectric constant of the material which comprises arranging the material so that the fibers thereof lie generally in the same direction, cutting the material transverse to the direction in which the fibers lie, forming a condenser with the dielectric forces extending transversely across the fibers and thereafter making measurements of the apparent capacity and determining thereby the moisture contents of the material.

4. A method of determining two varying quantities of materials in which the varying quantities produce two different apparent electric changes which comprises measuring the magnitude of one electric change against the magnitude of the other change and thereby determining a pair of curves of the family of curves identified with one quantity being measured, and measuring the second quantity as determined by the measurement of one of said electric changes in relation to the other of said pair of determined curves.

HYMAN OLKEN.